United States Patent
Napolitano

(10) Patent No.: US 6,363,655 B1
(45) Date of Patent: Apr. 2, 2002

(54) YOUNG TREE SUPPORT

(76) Inventor: Divid Napolitano, 780 S. Van Buren, Suite G, Placentia, CA (US) 92870

( * ) Notice: Subject to any disclaimer, the term of this patent is extended or adjusted under 35 U.S.C. 154(b) by 0 days.

(21) Appl. No.: 09/615,821

(22) Filed: Jul. 13, 2000

Related U.S. Application Data

(60) Provisional application No. 60/144,859, filed on Jul. 20, 1999.

(51) Int. Cl.[7] ............................................. A01G 17/06
(52) U.S. Cl. .................................. 47/42; 47/43; 47/44
(58) Field of Search ................................ 47/42, 43, 44

(56) References Cited

U.S. PATENT DOCUMENTS 4,562,662 A * 1/1986 Ten Pas .......................... 47/43
4,649,666 A * 3/1987 Ness et al. ..................... 47/43
4,870,781 A * 10/1989 Jones ............................. 47/43

* cited by examiner

Primary Examiner—Peter M. Poon
Assistant Examiner—Floris C. Copier
(74) Attorney, Agent, or Firm—Allen A. Dicke, Jr.

(57) ABSTRACT

The young tree support comprises a flexible polymer tube having its end staked by a first stake close to the tree. The flexible polymer tube is wound up the tree to a point between one-third and one-half the distance up the trunk of the tree. From that point, the second end of the tube is pulled to the windward. The second end of the tube has a spring by which the second end is connected to a second stake driven into the ground so that the second end is resiliently connected to the second stake. This provides adequate support for a young tree to permit flexure of the trunk during early growth.

19 Claims, 2 Drawing Sheets

YOUNG TREE SUPPORT

CROSS-REFERENCE

This application relies for priority upon Provisional Application, Serial No. 60/144,859, filed Jul. 20, 1999, the entire disclosure of which is incorporated herein by this reference.

FIELD OF THE INVENTION

This invention is directed to a young tree support which supplies support to the lower portion of the trunk of a young tree.

BACKGROUND OF THE INVENTION

Nursery trees are grown close together in containers so as to produce a tall tree in a short growing time. Young trees are sold from the nursery when they are about 6 feet tall. They are usually in a 5-gallon pot and have a trunk about the thickness of a man's thumb. There is sufficient heavy branching and foliage at the top of the tree so that, when separated from the group, the tree is not self-supporting. It is conventional to plant such trees between two tall stakes which hold the crown of the tree in place until the trunk is sufficiently strong to support the crown. These supporting stakes are traditionally as tall as the crown. It has been found that flexure of the trunk helps the trunk to gain strength to support the crown. The full-height support does not encourage gain in strength of the trunk.

SUMMARY OF THE INVENTION

In order to aid in the understanding of this invention, it can be stated in essentially summary form that it is directed to a young tree support which is comprised of an elongated flexible polymer member. The first end of the member is anchored to the ground close to the trunk. The flexible member is wound up the trunk, preferably to a height which is between one-third and one-half the distance from the ground to the crown. The supporting member is pulled to the windward and is anchored away from the tree. The connection between the member and the second anchor is preferably resilient. The member is preferably a tube.

It is, thus, a purpose and advantage of this invention to provide a young tree support which is of simple construction and ease of installation to adequately support the lower portion of the trunk of a young tree so that some flexure is permitted to encourage trunk growth.

It is another purpose and advantage of this invention to provide a young tree support which is resilient in the way in which it wraps around the tree trunk so as to avoid bark damage during growth.

It is a further purpose and advantage of this invention to provide a young tree support which is resiliently connected to a second anchor on the windward side.

Other purposes and advantages of this invention will become apparent from a study of the following portion of the specification, the claims and the attached drawings.

DESCRIPTION OF THE PREFERRED EMBODIMENTS

Figure 1:
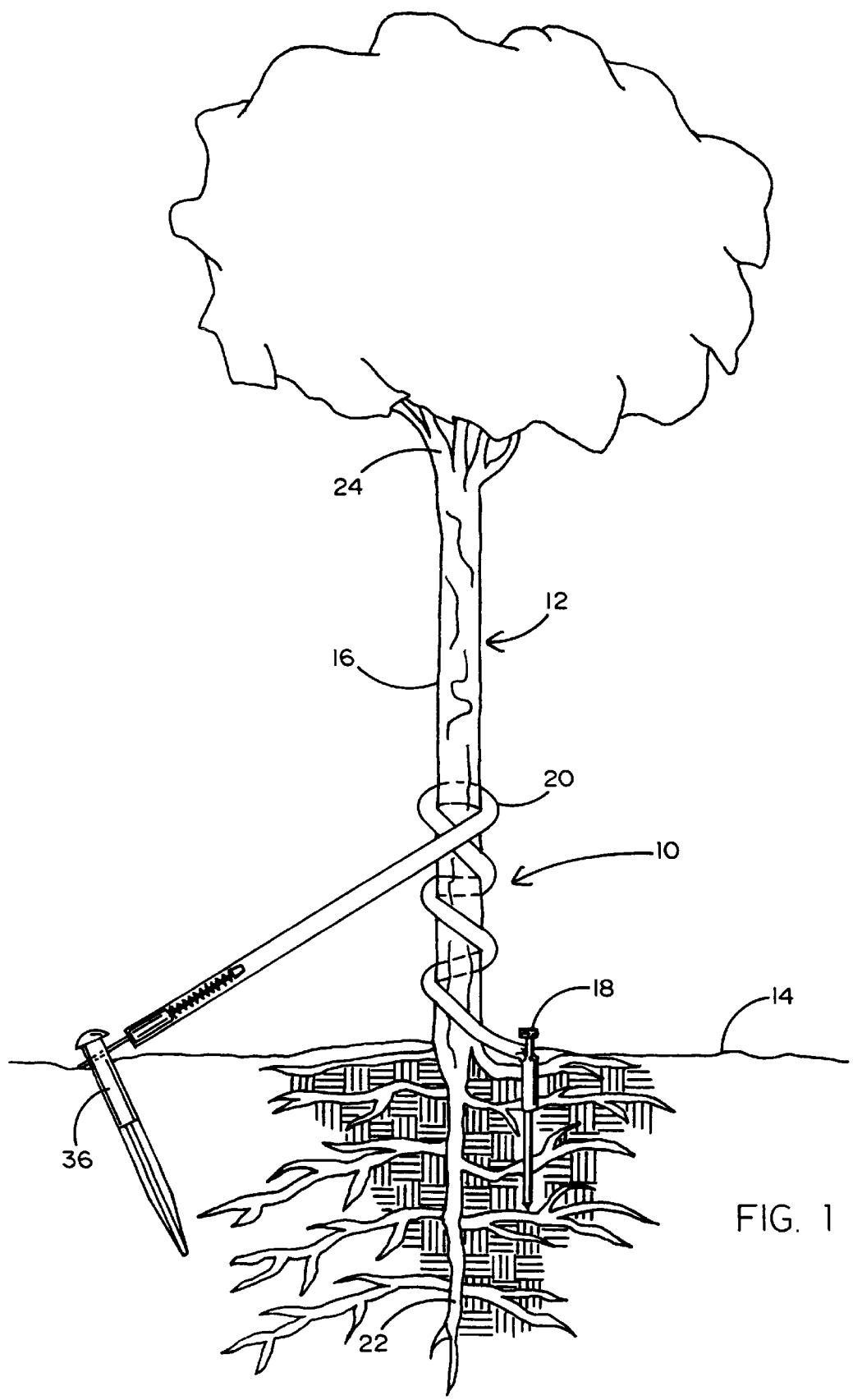
FIG. 1 is a side-elevational view of the young tree support of this invention, with parts broken away.

The young tree support of this invention is indicated at 10 in FIG. 1. It is shown as supporting a young nursery grown tree 12 which is now planted in the ground 14.

It has been discovered that only the lower part of the trunk 16 needs to be supported in order to provide adequate support for young nursery trees such as tree 12. As shown in the drawing, the young tree support has a first stake 18 which is driven almost vertically into the ground close to the primary root 22 of tree 12. A flexible polymer composition tube 20 is fastened to the top of the first stake 18 and is wrapped upward around the trunk for a few turns; for example, five turns. The synthetic polymer tube is flexible and somewhat stretchy. A suitable material for the synthetic polymer tube is blank polymer, with the tube outside dimension of ½ inch and a wall thickness of ⅛ inch. The tube serves the principle tree support member.

The first stake 18 can be a fairly small, simple stake, such as a 20-penny common nail. It may be attached to the first end of the tube 20 by entering the point of the nail through an opening in the side of the tube so that the head of the nail is engaged against the side of the tube at the opening and the tip of the nail extends out of the tube and downward into ground engagement for securement of the first end of the tube 20. The stake 18, in the form a large nail, is sufficiently long to anchor the first end of the tube adjacent the trunk of the tree and adjacent the tap root 22 of the tree.

The tube 20 is wound around the trunk of the tree, spirally upward from its first end, which strengthens this part of the tree trunk. The tube 20 preferably has a sufficient length so that it can be wound up the tree trunk from between one-third to one-half the height of the tree crown 24 above the ground.

Figure 2:
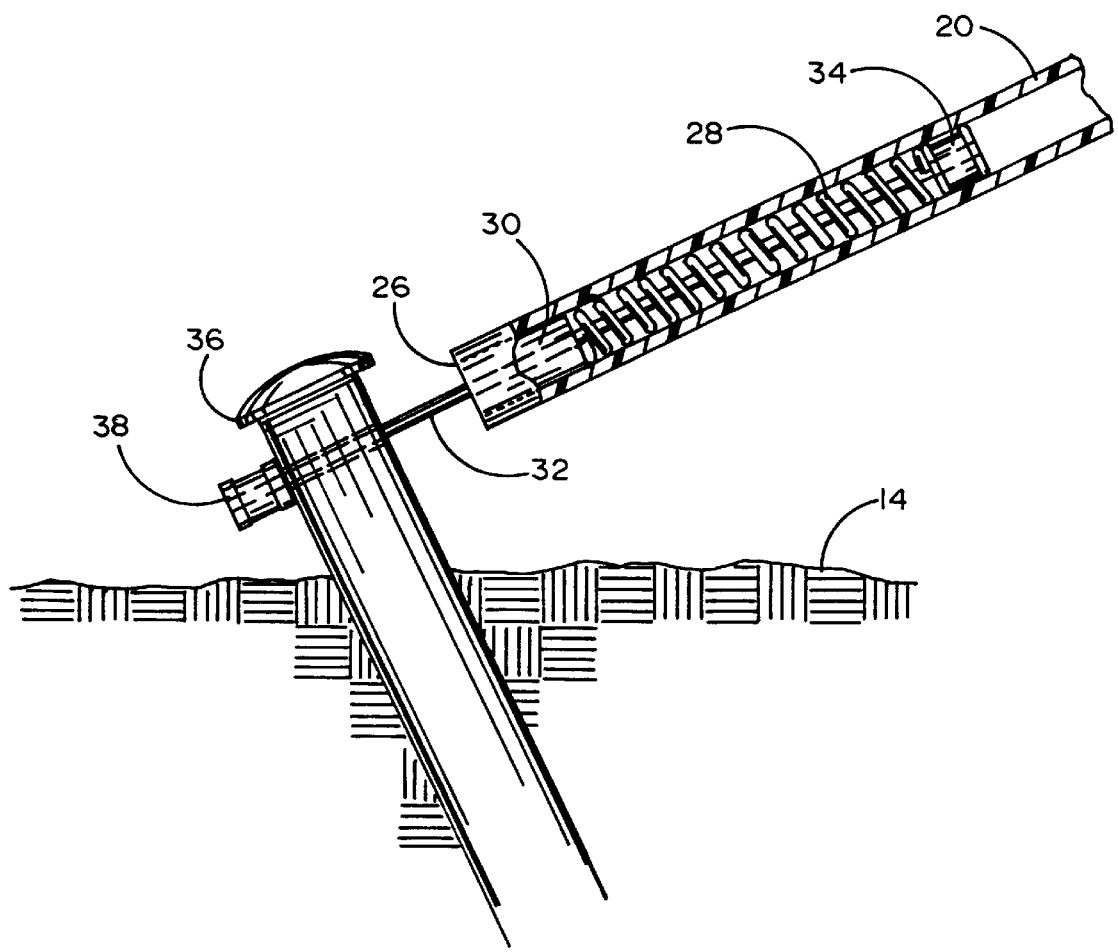
FIG. 2 is an enlarged side-elevational view of the young tree support of this invention, with parts broken away.

As seen in FIG. 2, the second end 26 of the tube 20 has a compression spring 28 therein. The tube is capped by plug 30 to hold the outer end of compression spring 28. The plug 30 is preferably adhesively secured in place. The plug is in the form of a tube having a small central hole. A tension cable 32 out extends through the plug 30. Spring 28 and has a spring-engagement washer 34 on its inner end. On its outer end, the tension cable is attached to a second stake 36. Attachment is made by the cable 32 passing through an opening in the stake which cable stop 38 secured to the outer end of the cable 32. After the tube 20 is wrapped around the lower part of the trunk 16 of the tree, it provides the primary support. When the correct amount of tube 20 is left over after winding up the trunk 16, the second stake 36 is pulled to windward. The spring 28 is at least partially compressed, and the stake 36 is driven into the ground 14 to anchor the second end of the tube 20 with the spring 28 partially compressed.

As the wind blows, the trunk moves, but the wrapping of the lower part of the trunk 16, together with windward support provides support for the young tree 12. As the tree 12 grows, the polymer tube 20 stretches to avoid injury to the bark and associated near surface layers of the tree trunk. The young tree tie provides adequate support in normal conditions for nursery-grown trees so that the trees are properly supported for growth.

This invention has been described in its presently preferred embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A young tree support for a young tree planted in the ground and having a trunk, said young tree support comprising:

a flexible support member having a first end and a second end, said flexible support member being continuous from said first and to said second end, a first short stake attached to said first end for insertion into the ground adjacent the trunk of the tree for securing said first end of said support member close to the ground adjacent to the tap root of the tree, said support member being sufficiently long and sufficiently flexible so that said support member can be spirally wrapped from its first end spirally upward on the trunk of the tree;

a second short stake attached to said second end of said support member, said second short stake being insertable into the ground on the windward side of the tree at a greater distance from the trunk than said first short stake so that the young tree has its trunk spirally wrapped from the ground upward to a point where said member is pulled down close to the ground to the windward by said second stake.

2. The young tree support of claim 1 wherein said second end of said support member is resiliently attached to said second stake.

3. The young tree support of claim 1 wherein said flexible member is a flexible synthetic polymer tube.

4. The young tree support of claim 3 wherein said flexible member has a spring therein adjacent its second end and said spring is attached to said second stake to provide resilient tension between said second end of said support member and said second stake.

5. The young tree support of claim 4 wherein said spring is a compression spring.

6. The young tree support of claim 5 wherein said second end of said tubular support member has a tubular plug therein and a compression spring engages against said tubular plug.

7. The young tree support of claim 6 wherein there is a tension member attached to said second stake, said tension member extending through said tubular plug and through said spring, said tension member having an engagement washer thereon engaging on said compression spring.

8. The young tree support of claim 7 wherein said tension member is a cable and there is an opening in said second stake, said cable extending through said opening in said second stake and being engaged by a cable clamp which engages against said second stake.

9. A young tree support for a young tree planted in the ground and having a trunk, said young tree support comprising:

a continuous flexible tubular support member having a first end and a second end;

a first short stake attached to said first end, said first end of said flexible support member is attached to said first stake by said first stake passing through an opening in the side of said tube adjacent said first end and exiting out of said first end of said flexible support member, said first stake having a head thereon, with the head of said first stake engaging on the outside of said flexible support member, said first stake being configured to engage in the ground adjacent the trunk of the young tree to secure said first end of said flexible support member close to the ground with respect to the trunk and close to the trunk, said support member being sufficiently long and sufficiently flexible so that it can be spirally wrapped upward on the trunk from said first short stake to a position above said first short stake and said second end can be pulled away from the trunk to the windward;

a second short stake resiliently attached to said second end of said support member, said support member being sufficiently long so that said second short stake can be anchored in the ground a distance away from the first stake at least as far as said support member is spirally wrapped around the tree trunk so that the tree trunk is supported both by spiral wrapping of the flexible support member around the trunk and by the windwardly directed diagonally downward direction of the resilient support.

10. A young tree support for a young tree planted in the ground and having a trunk, said young tree support comprising:

a continuous flexible support member having a first end and a second end;

a first short stake attached to said first end, said first stake being configured to engage in the ground adjacent the trunk of the young tree to secure said first end of said flexible support member close to the ground with respect to the trunk and close to the trunk, said support member being sufficiently long and sufficiently flexible so that it can be spirally wrapped upward on the trunk from said first short stake to a position above said first short stake and said second end can be pulled away from the trunk to the windward;

a second short stake resiliently attached to said second end of said support member, said support member being sufficiently long so that said second short stake can be anchored in the ground a distance away from the first short stake at least as far as said support member is spirally wrapped around the tree trunk so that the tree trunk is supported both by spiral wrapping of the flexible support member around the trunk and by the windwardly directed diagonally downward direction of the resilient support.

11. The young tree support of claim 10 wherein said flexible support member is tubular and said second end of said flexible support member has a spring therein, said spring having a first end engaging said flexible support member and having a second end attached to said second stake.

12. The young tree support of claim 11 wherein said spring is a compression spring within said tubular support member adjacent its second end, said tubular support member having a tubular plug therein at its second end for engagement by said compression spring and a tension member attached to said second stake and passing through said tubular plug and said spring, said tension member having a stop thereon engaging said compression spring so that tension on said tension member compresses said spring to provide tension in said flexible support member.

13. The young tree support of claim 12 wherein said first end of said tubular flexible support member is attached to said first stake by said first stake passing through an opening in the side of said tube adjacent said first end and exiting out of the first end of said flexible support member, said first stake having a head thereon, with the head of said first stake engaging on the outside of said flexible support member.

14. The young tree support of claim 12 wherein said tension member is a cable and said cable passes through an opening in said second stake and is secured to said stake by a cable clamp engaging said cable against said second stake so as said second stake is engaged in the ground, said compression spring is first partially compressed to provide tension in said young tree support member.

15. The method of supporting a young tree planted in the ground and having a trunk with a crown comprising the steps of:

creating a support structure having an elongated continuous flexible support member which has first and second ends and having a first short stake attached to the first end of the flexible support member;

inserting the first short stake into the ground close to the trunk of a young tree to be supported;

spirally wrapping the flexible support member up the trunk for a distance upward between one-third and one-half the distance from the ground to the crown of the tree;

pulling the second end of the flexible support member down to the ground to the windward of the tree;

resiliently securing the second end to the ground to the windward of the trunk of the young tree.

16. The method of supporting a young tree planted in the ground and having a trunk comprising the steps of:

creating a support structure having an elongated continuous flexible support member which has first and second ends and having a first short stake attached to the first end of the flexible support member;

inserting the first short stake into the ground close to the trunk of a young tree to be supported;

spirally wrapping the flexible support member up the trunk of the tree from the first short stake;

pulling the second end of the flexible support member down to the ground to the windward of the tree; and resiliently securing the second end to the ground to the windward of the trunk of the young tree.

17. The method of supporting a young tree in accordance with claim 16 wherein the step of resiliently attaching the second end of the flexible support member to the ground includes the preliminary step of:

placing a spring within the second end of the flexible support member adjacent its second end and attaching the spring to a second stake so that placement of the second stake into the ground resiliently attaches the second end of the support member to the ground.

18. The method of supporting a young tree in accordance with claim 17 wherein the step of inserting a spring within the second end of the flexible support member includes:

placing a compression spring within the second end; and placing a spring stop within the flexible support member at the second end to retain the compression spring within the flexible support member.

19. The method of supporting a young tree planted in the ground and having a trunk comprising the steps of:

creating a support structure having an elongated continuous flexible support member which has first and second ends and having a first short stake attached to the first end of the flexible support member;

inserting the first short stake into the ground close to the trunk of a young tree to be supported;

spirally wrapping the flexible support member up the trunk of the tree from the first short stake for a distance upward between one-third and one-half the distance from the ground to the crown of the tree;

pulling the second end of the flexible support member down to the ground to the windward of the tree; and resiliently securing the second end to the ground to the windward of the trunk of the young tree.

* * * * *

UNITED STATES PATENT AND TRADEMARK OFFICE
CERTIFICATE OF CORRECTION

PATENT NO. : 6,363,655 B1
DATED : April 2, 2002
INVENTOR(S) : David Napolitano

It is certified that error appears in the above-identified patent and that said Letters Patent is hereby corrected as shown below:

<u>Title page,</u>
Item [76], the inventor's name should read -- David Napolitano --

Signed and Sealed this

Twenty-first Day of January, 2003

JAMES E. ROGAN
*Director of the United States Patent and Trademark Office*